(12) United States Patent
Van Der Upwich

(10) Patent No.: US 12,320,436 B2
(45) Date of Patent: Jun. 3, 2025

(54) CHECK VALVE

(71) Applicants: HaGePe International B.V., Huizen (NL); Cenergist Limited, Washington (GB)

(72) Inventor: Stijn Van Der Upwich, Enkhuizen (NL)

(73) Assignees: HAGEPE INTERNATIONAL B.V., Huizen (NL); CENERGIST LIMITED, Washington (GB)

( * ) Notice: Subject to any disclaimer, the term of this patent is extended or adjusted under 35 U.S.C. 154(b) by 327 days.

(21) Appl. No.: 17/625,921

(22) PCT Filed: Jul. 10, 2020

(86) PCT No.: PCT/NL2020/050459
§ 371 (c)(1),
(2) Date: Jan. 10, 2022

(87) PCT Pub. No.: WO2021/010829
PCT Pub. Date: Jan. 21, 2021

(65) Prior Publication Data
US 2022/0252168 A1     Aug. 11, 2022

(30) Foreign Application Priority Data

Jul. 12, 2019 (NL) ........................ 2023495
Dec. 3, 2019 (NL) ........................ 2024369

(51) Int. Cl.
*F16K 15/06* (2006.01)
*F16K 27/02* (2006.01)

(52) U.S. Cl.
CPC ........ *F16K 15/063* (2013.01); *F16K 27/0209* (2013.01)

(58) Field of Classification Search
None
See application file for complete search history.

(56) References Cited

U.S. PATENT DOCUMENTS 5,601,112 A * 2/1997 Sekiya ................. F16K 15/148
137/854
2006/0278279 A1 12/2006 Farano
(Continued)

FOREIGN PATENT DOCUMENTS

CN   203926943 U * 11/2014 ........... G05D 7/0133
GB   976940        12/1964
(Continued)

*Primary Examiner* — Angelisa L. Hicks
(74) *Attorney, Agent, or Firm* — MH2 Technology Law Group, LLP

(57) ABSTRACT

The present application relates to a check valve (1) comprising a housing (2) with at least one inlet (3) and at least one outlet (4), the housing (2) defining an inflow chamber (5) connected to the at least one inlet (3) and an outflow chamber (6) connected to the at least one outlet (4), a valve seat (7) which defines a passage between the inflow chamber and the outflow chamber, and a shutter (8) which is displaceable with respect to the valve seat (7) between a closed position and an open position, the check valve (1) being provided with a guide pin (9) for guiding the shutter (8) between the open and closed positions, wherein the guide pin (9) at least partly extends in the inflow chamber (5) in a direction away from the shutter, the guide pin (9) being movably guided in a guide sleeve (10).

15 Claims, 4 Drawing Sheets

(56) References Cited

U.S. PATENT DOCUMENTS

Figure 1:
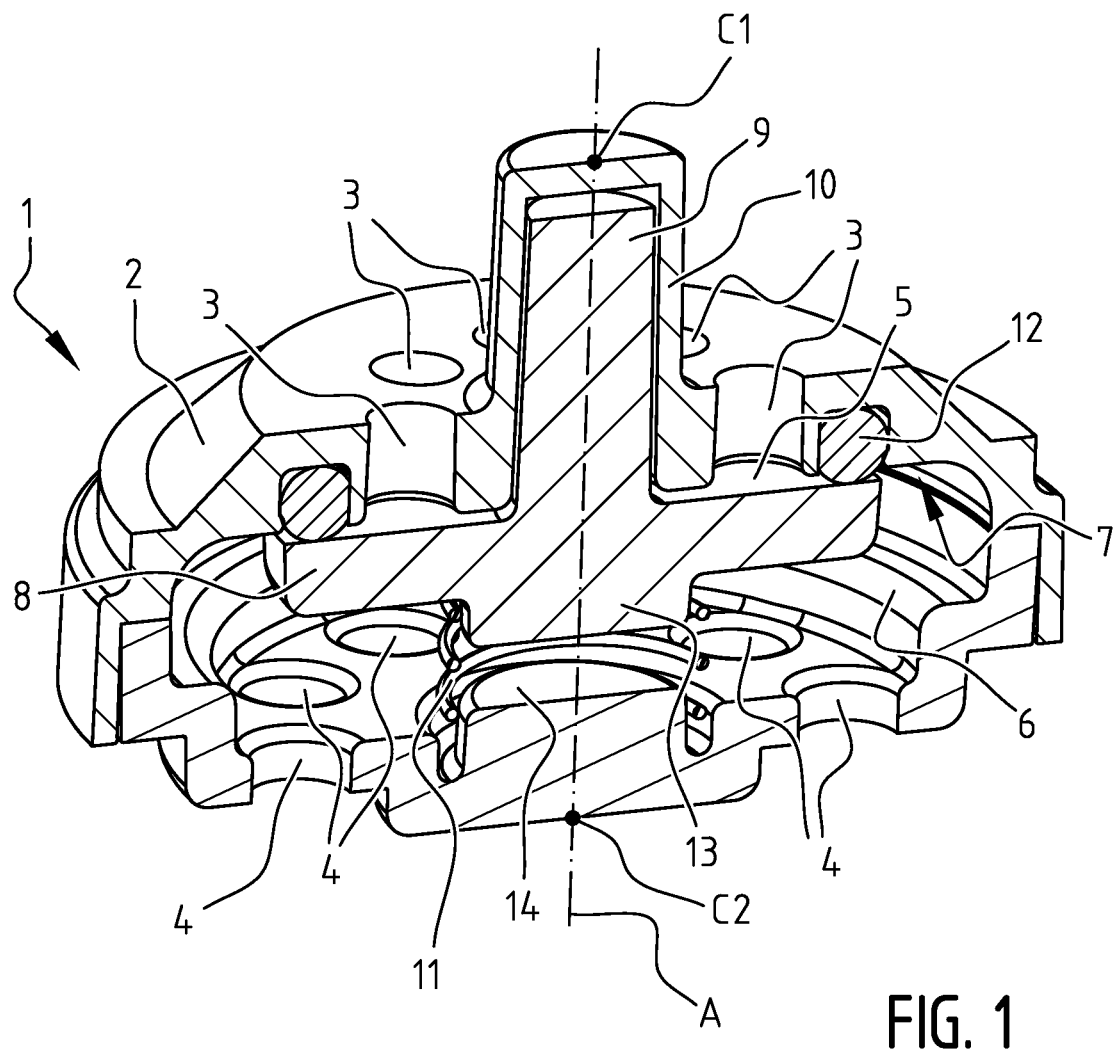

2016/0291602 A1 10/2016 Nederland
2022/0252168 A1 8/2022 Van Der Upwich

FOREIGN PATENT DOCUMENTS

| GB | 2585765 | | | 1/2021 | |
|----|---------|---|---|--------|---|
| JP | S59123259 | | | 7/1984 | |
| JP | 3127795 | | | 12/2006 | |
| JP | 2010249253 | A | * | 11/2010 | |
| NZ | 572607 | A | * | 8/2011 | ........... G05D 7/0133 |
| WO | 2009062997 | | | 5/2009 | |
| WO | 2015069114 | | | 11/2014 | |
| WO | 2021010827 | | | 1/2021 | |

* cited by examiner

CHECK VALVE

The invention relates to a check valve comprising
a housing with at least one inlet and at least one outlet, the housing defining an inflow chamber connected to the at least one inlet and an outflow chamber connected to the at least one outlet,
a valve seat which defines a passage between the inflow chamber and the outflow chamber, and
a shutter which is displaceable with respect to the valve seat between a closed position, in which the shutter closes the passage so that substantially no fluid can flow through the passage, and an open position in which the shutter is removed from the valve seat and leaves the passage at least partly free so fluid can flow from the at least one inlet to the at least one outlet via the passage.

Such a check valve is known in the art, and is for instance used by water utility companies to prevent backflow in water supply lines by disposing the check valve in the lines or in flow regulators.

It is an object of the invention to improve the known check valve by increasing its stability.

This object is achieved by a check valve according to the preamble, further comprising a guide pin for guiding the shutter between the open and closed positions, wherein the guide pin at least partly extends in the inflow chamber in a direction away from the shutter, the guide pin being movably guided in a guide sleeve.

As a result of fluid pressure and dynamics, forces acting on the shutter exist in the proximity of the inlets. The guide pin and guide sleeve are placed relatively close to the inlets. Thus, the guide pin and sleeve are arranged relatively close to the point at which said forces act. Consequently, the guide pin and guide sleeve may effectively counteract the forces acting on the shutter. This can contribute to a stable operation of the check valve.

In particular, the direction in which the guide pin extends is parallel to a through flow direction of the check valve, the through flow direction of the valve being defined as running from the inlets to the outlets. As a result the shutter may be movable between the open and closed position along the same direction, and preferably only along said direction. Preferably, the guide pin is only movable in said flow direction with respect to said sleeve.

In particular, the sleeve may be a part, possibly an integral part of the body of the check valve. It is noted that the guide pin may be fixedly connected to the shutter, or the guide pin may be a monolithic part with the shutter.

As an alternative to the guide pin being movably guided in a guide sleeve, the guide pin may be fixed with respect to the body, while the shutter is movably guided along the guide pin. The shutter may therefore be provided with a through hole for receiving said pin. In this embodiment, a guide sleeve may not be necessary. It is then preferred if the shutter is properly guided.

Consequently, a check valve according to the preamble is provided comprising a guide pin at least partly extending in the inflow chamber in a direction away from the shutter, wherein the shutter is movable guided with respect to the body using the guide pin.

In an embodiment of the check valve, the guide pin extends beyond the valve seat in the first direction as seen from the shutter.

In this embodiment, the guide pin can be relatively long without increasing the distance between the valve seat and the outlets. As a result, the check valve is relatively small in relation to the length of the guide pin. The relatively small size of the check valve may offer the advantage of being easily fitted in e.g. a flow regulator or water supply pipe, whilst the relatively large length of the guide pin may offer the advantage of an accurate and stable linear guiding of the guide pin.

Particularly, the guide pin may extend beyond the inlets.

Preferably, the guide pin extends only in the direction away from the shutter towards the inlet. The guide pin then does not extend from the other side of the shutter.

In this embodiment, the entire length of the guide pin contributes to the aforementioned counter moment to enable a stable movement of the guide pin with the shutter. As such, the guide pin can be used in combination with the guide sleeve effectively for a stable operation of the check valve.

Because the entire length of the guide pin is used to increase stability of the check valve, compactness of the check valve can be maintained.

In another embodiment of the check valve, the shutter comprises a plate shaped, preferably a disk shaped, body. This embodiment may prove practical since the plate allows a check valve which is relatively short as measured from the inlet to the outlet.

In yet another embodiment of the check valve, the check valve comprises multiple inlets arranged radially symmetrically around a longitudinal axis coinciding with the guide pin.

In this embodiment, fluid forces on the shutter will be centered around the guide pin, so that lateral forces on the guide pin may substantially cancel out. This can contribute to stable operation of the check valve.

Preferably, multiple inlets debouche in the inflow chamber, preferably also in the closed position.

In the closed position, the single inflow chamber is connected to each of the multiple inlets.

In this embodiment, the fluid flows through the multiple inlets unite in the inflow chamber. The pressure of the fluid flow on the shutter is equally distributed over the face of the shutter which further contributes to a stable operation of the check valve.

In yet another embodiment of the check valve, the check valve comprises multiple outlets arranged radially symmetrically around a longitudinal axis coinciding with the guide pin.

It is believed that by arranging the outlets radially symmetrically around said longitudinal axis, a more or less stable fluid flow pattern can be created, which does not or only to a small extent acts on the shutter laterally. This in turn contributes to a stable operation of the check valve.

Practically, the check valve further comprises a bias element which pretensions the shutter towards its closed position. The bias element automatically closes the check valve when fluid flow falls below a certain threshold. By selecting the biasing force of the bias element, in relation to geometrical parameters of the check valve, said threshold can be set to a desired value.

Particularly, the bias element can be arranged on a side of the shutter facing the at least one outlet.

Accordingly, the bias element may provide a push force for biasing the shutter to its closed position. Bias elements providing a push force may offer the advantage of being readily available, durable, and relatively easy to install. More in particular, the bias element may comprise a compression spring.

Also in particular, the bias element may be disposed in the outflow chamber. Disposing the bias element in the outflow chamber may result in a compact construction of the check valve.

In yet another embodiment of the check valve, the bias element directly contacts the shutter. This embodiment may result in a relatively compact construction of the check valve.

In yet another embodiment of the check valve, the check valve comprises at least one stop for limiting movement of the shutter beyond the open position.

When the shutter is prevented to move beyond the open position, the open position is particularly clearly defined. As a result, a relatively stable flow of fluid can be established when the shutter is in the open position, even if input fluid pressure temporarily increases.

The stop may comprise two cooperating stop elements, which are in mutual contact when the shutter is in the open position, thereby stopping the shutter from moving beyond the open position.

A first of the stop elements may be connected to or part of the shutter, whilst a second of the stop elements may be connected to or part of the housing.

When the bias element comprises a compression spring, it may be disposed and guided around the stop. Accordingly the stop performs its function of stopping the shutter, but also that of guiding the compression spring. As a result, the check valve having these features may be relatively compact.

More in particular, if the stop comprises two stop elements, one of which is fixed to the shutter and another of which is fixed to the housing, the compression spring may be guided around the stop elements and disposed between them. Using the stop elements as guides for the compression spring may contribute to a stable operation of the check valve, since the stop elements effectively guide the shutter via the compression spring.

In yet another embodiment of the check valve, the check valve comprises an O-ring arranged between the shutter and the valve seat.

The O-ring may aid in closing the passage, in order to block liquid flow from the inflow chamber to the outflow chamber, and thus from the inlets to the outlets of the check valve. Accordingly, the O-ring may be said to be comprised by, or to constitute, the valve seat.

The check valve can be used in a fluid flow regulator, for instance for regulating the flow of water.

The flow regulator may comprise a valve chamber having a fluid inlet and a fluid outlet; and a valve member inside the valve chamber, the valve member moveable inside the valve chamber.

The valve member may be flat, but preferably the valve member is concave. The valve member is normally concave in the direction of and/or adjacent to the fluid inlet and/or convex in the direction of and/or adjacent to the fluid outlet of the flow regulator.

Additionally or alternatively the valve member may have an asymmetrical lower surface, the lower surface being defined as closer to the fluid outlet of the flow regulator.

The fluid flow regulator may reliably and/or reproducibly regulate fluid flow when the pressure of fluid supplied to the fluid inlet of the flow regulator is from 1.5 to 10 bar. In use, the variation in flow rate of fluid passing out the fluid outlet of the flow regulator should preferably (on average) be less than 2%, more preferably less than 1%, at varying fluid pressures and/or flow rates of fluid supplied to the fluid inlet of the flow regulator.

The concave and/or convex shape of the valve member contributes to the abovementioned relatively small variation in fluid flow rate compared to known fluid flow regulators. The relatively small variation in fluid flow rate may be an extremely small variation in fluid flow rate.

The concave and/or convex shape of the valve member is major contributor for an increased pressure range across which the fluid flow regulator can provide at least substantially pressure-independent fluid flow. The at least substantially pressure-independent fluid flow may be practically pressure-independent fluid flow.

The concave valve member may be and/or may be referred to as one or more of dished; curved; depressed; sunken; indented; recessed; or not flat.

In use the valve chamber defines a flow path and/or boundary between the fluid inlet of the flow regulator and the fluid outlet of the flow regulator. The fluid flow regulator may for instance comprise a flow regulator housing provided with the fluid inlet of the flow regulator and the outlet of the flow regulator and the valve chamber there between. The valve member is preferably arranged in the flow regulator housing and is movable to and from a valve seat of the flow regulator, defining a flow opening there between. The valve member will be movable under the influence of a pressure of the fluid and is arranged to adjust the size of the flow opening in dependence of the pressure of the fluid and/or flow rate, such that the flow of liquid is substantially constant over a pressure range. To ensure a flow of liquid through the opening even at higher pressures, i.e. to prevent full closure of the flow opening, the valve seat of the flow opening is preferably provided with a least one protruding member for limiting the movement of the valve member towards the valve seat of the flow regulator.

In use the valve member moves relative to the valve chamber, preferably towards and from the valve seat of the flow regulator as describes above, to provide a flow of fluid from the fluid inlet of the flow regulator to the fluid outlet of the flow regulator at a pressure and/or flow rate that is substantially independent of the pressure and/or flow rate of the fluid supplied to the fluid inlet.

The check valve may be disposed downstream, i.e. towards an outlet side of the valve member of the fluid flow regulator. Accordingly, the at least one inlet of the check valve may be connected to the fluid outlet of the flow regulator.

The housing of the check valve may be made of metal, e.g. steel. Additionally or alternatively, the shutter may be made of metal, e.g. steel. Both of these steel types may independently of each other have Young's modulus between 150 GPa and 250 GPa, more particularly between 190 GPa and 210 GPa, even more particularly around 200 GPa. In particular, the check valve may be configured to allow a through flow of 5-10 L/min, preferably 7-9 L/min, even more preferably around 7.8 L/min of water at an upstream fluid pressure of 0.5 bar as compared to the fluid pressure downstream.

The check valve may be configured to at least partly open, i.e. the shutter may move at least somewhat towards its open position at a pressure upstream of the shutter at least 0,001 bar higher than the pressure downstream of the shutter, preferably at least 0,002 bar, most preferably at 0,001 bar.

Figure 2A:
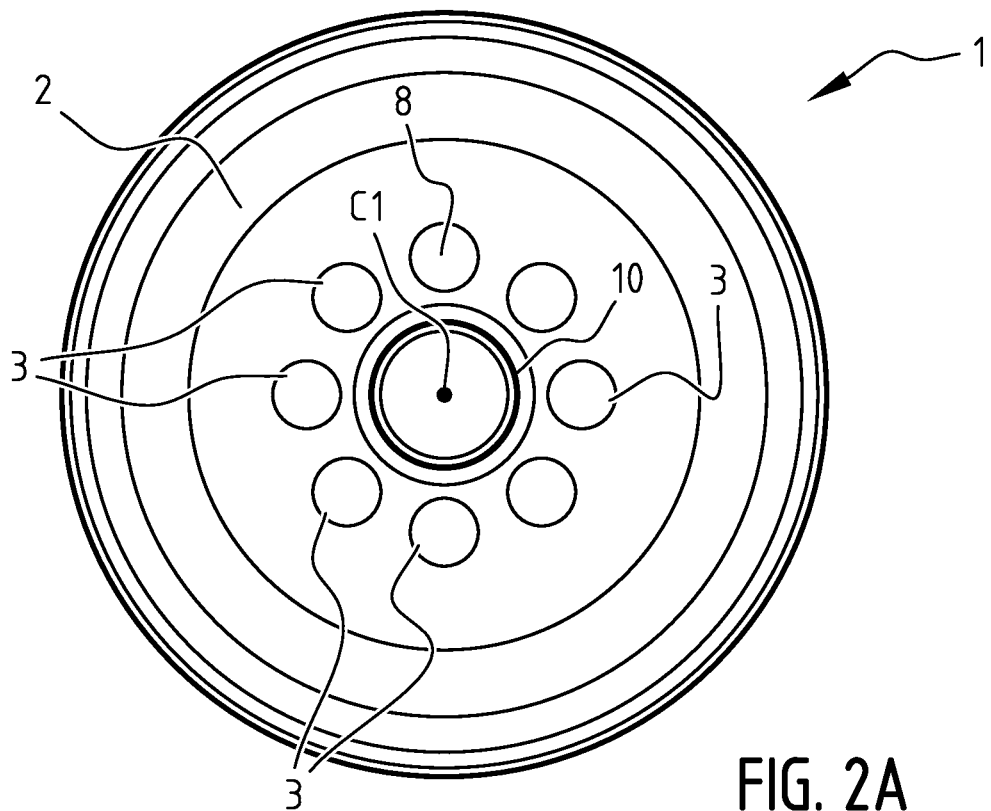
Figure 2B:
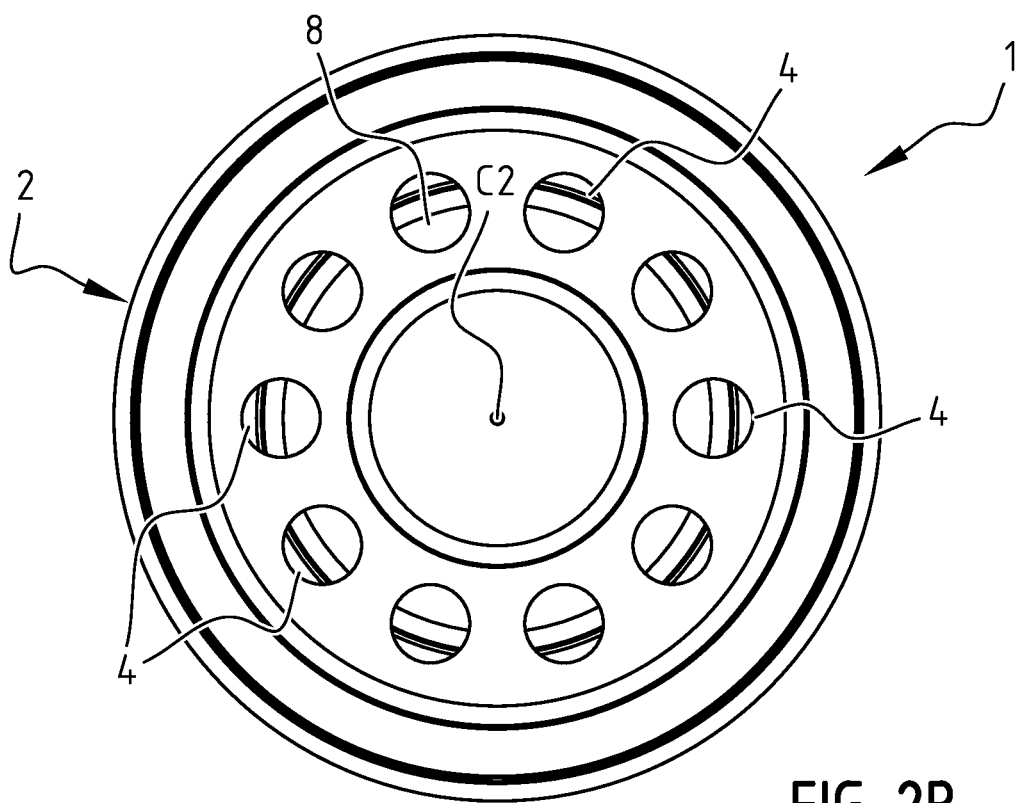
Figure 3:
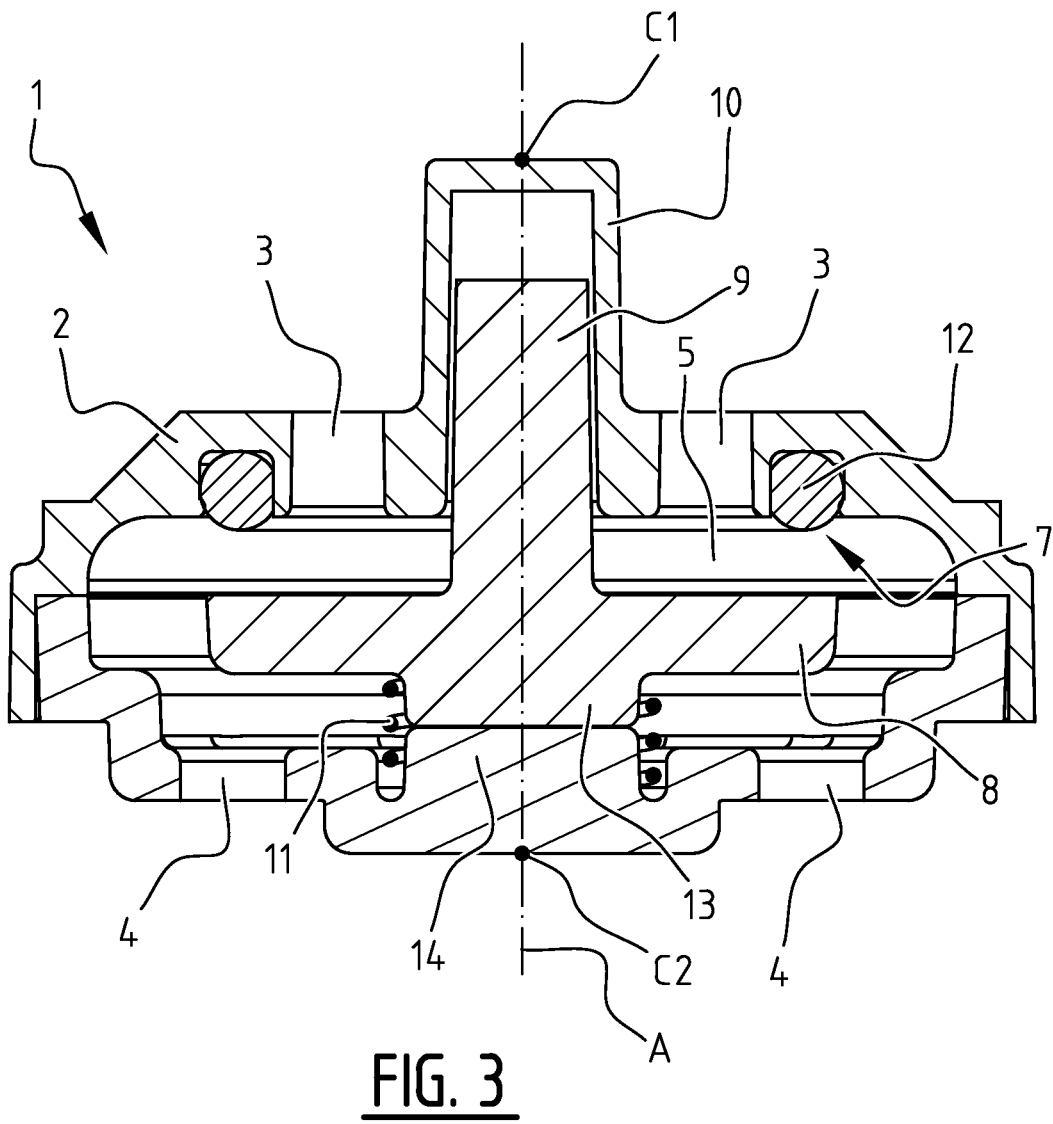
Figure 4:
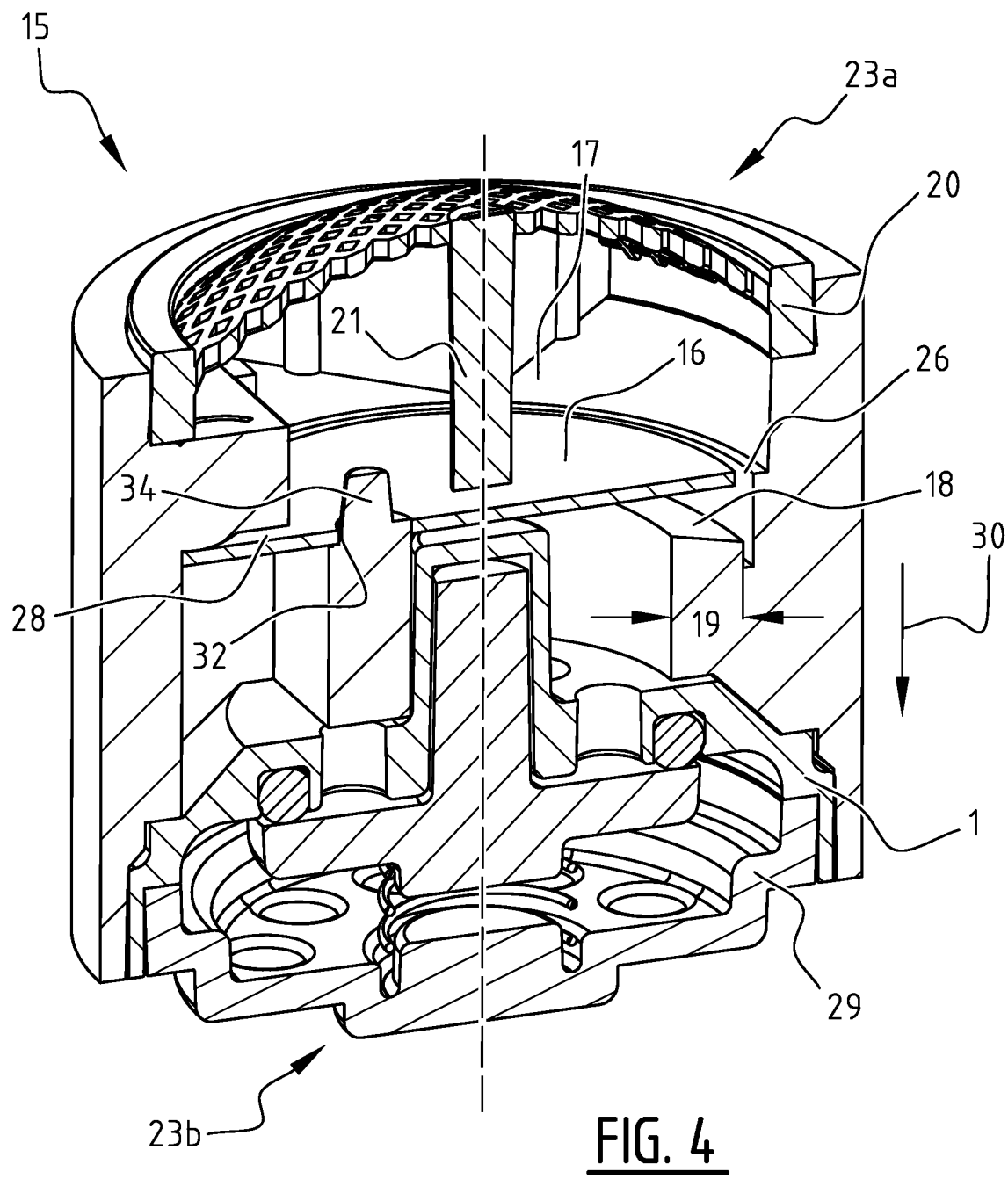

The invention will be further elucidated with reference to the attached figures, wherein:

FIG. 1 schematically shows a perspective view of a, partially cut, embodiment of the check valve;

FIGS. 2A and 2B schematically show a top and bottom view of the check valve of FIG. 1;

FIG. 3 schematically shows a longitudinal cross section of the check valve of FIGS. 1-2B; and FIG. 4 schematically shows a cross sectional view of a fluid flow regulator with a check valve as described above.

In the figures, like elements are referred to by like reference numerals.

FIGS. 1-3 show a check valve 1. The check valve may be used to prevent backflow of a fluid, such as a liquid, such as water. The check valve 1 comprises a housing 2, which has several inlets 3 and several outlets 4. The housing defines an inflow chamber 5 connected to the inlets 3.

Accordingly, fluid can enter the inflow chamber 5 via the inlets. The housing also defines an outflow chamber 6, connected to the outlets 4. Accordingly, fluid can exit the outflow chamber 6 via the outlets 4. The check valve 1 has a valve seat 7 which defines a passage between the inflow and outflow chambers 5, 6. In this embodiment, the valve seat 7 comprises an O-ring 12. The check valve 1 further has a shutter 8, which is displaceable with respect to the valve seat 7 between a closed position and an open position. In this embodiment, the shutter 8 is a disk shaped body.

The check valve is depicted in its closed position in FIG. 1, and in its open position in FIG. 3. In the closed position (FIG. 1), the shutter 8 closes the passage so that no fluid can flow therethrough. In the open position (FIG. 3), the shutter 8 is removed from the valve seat 7, so that the passage is open.

The check valve further has a guide pin 9 which extends away from the shutter 8 in the inflow chamber 5. The guide pin 9 is guided in a guide sleeve 10, which in this case is part of the housing 2. The guide pin 9 can move reciprocally in its longitudinal direction within the guide sleeve 10, thereby guiding the shutter 8 between its open and close position in the same direction. The guide pin 9, due to its length, extends beyond the valve seat 7.

The check valve 1 further has a compression spring 11 which acts as a bias member, for biasing the shutter 8 towards its closed position, i.e. against the valve seat 7. The compression spring 11 is positioned on a side of the shutter 8 which faces the outlets 4, in this case in the outflow chamber 6. The compression spring 11 is placed between the housing 2 and the shutter 8, and is guided by two stop elements 13, 14, which cooperate to form a stop of the check valve 1. A first of the stop elements 13 is a part of the shutter, and is formed by a protrusion. The second of the stop elements 14 is part of the housing 2, and is also formed by a protrusion. The compression spring 11 is placed around the stop elements 13, 14, so that it is guided along its axis by the stop elements 13, 14. As shown in FIG. 3, the stop elements 13, 14 contact each other when the shutter 8 is in the open position, so that the shutter 8 can not move beyond its open position.

As can be seen best in FIGS. 2A and 2B, the inlets 3 (FIG. 2A) and outlets 4 (FIG. 2B) are arranged radially symmetrically around central points C1, C2 of the check valve 1. The central points C1, C2 lie on an axis which coincides with that of the longitudinal axis of the guide pin 9.

Thus, the inlets 3 and outlets 4 lie radially symmetrically around an extension of the longitudinal axis of the guide pin 9.

FIG. 4 shows a cross-sectional view of a fluid flow regulator 15. The fluid flow regulator 15 comprises a valve chamber 17 having a fluid inlet 23a and a fluid outlet 23b. There is a valve member 16 inside the valve chamber 17. The valve member 16 is moveable inside the valve chamber 17 and contactable with a valve seat 18 of the flow regulator 15 inside the valve chamber 17. Importantly, the valve member 16 is concave in shape. FIG. 4 does not show fluid in the fluid flow regulator 15.

The fluid flow regulator 15 may be referred to as a dynamic fluid flow regulator. That is because the valve member 16 is moveable relative to the valve chamber 17. This contrasts with widely available pressure-fall dependent fluid flow regulators.

The fluid flow regulator 15 includes a strainer 20 at the top or fluid inlet 23a of the fluid flow regulator 15. The fluid flow regulator 15 includes a check valve 1 as described above at the bottom or fluid outlet 23b of the fluid flow regulator 15. The bottom of the check valve 1 may be referred to as resistance controller 29. The strainer 20 has a pin 21 that helps to keep the valve member 16 in the valve chamber 17.

The strainer 20 at the top or fluid inlet 23a of the fluid flow regulator 15 helps to stop larger solid particles from entering the valve chamber 17. The holes in the resistance controller 29, i.e. the outlets 4 of the check valve 1 at the bottom or fluid outlet 23b of the fluid flow regulator 15 are larger than the holes in the strainer 20 at the top or fluid inlet 23a of the fluid flow regulator, so that solid particles do not accumulate in the fluid flow regulator 15. Solid particles that get into the fluid flow regulator 15 typically therefore also come out.

The valve member 16 is concave in the direction of the fluid inlet 23a and convex in the direction of the fluid outlet 23b.

In use, the valve member 16 moves inside the valve chamber 17 and is contactable with the valve seat 18 inside the valve chamber. The valve member 17 is moveable relative to the valve seat 18.

The valve seat 18 has a radial width 19 of 1.97 mm.

In use, the resistance controller 29 is used to control or influence the backpressure of fluid (not shown) in the valve chamber. The resistance controller 29 restricts the flow of fluid out of the valve chamber 17 to create a higher backpressure.

In use, fluid (not shown) enters the valve chamber 17 and pushes down on the valve member 16.

Some fluid flows past the valve member 16 and valve seat 18, flowing through the gap 26 between the valve member 16 and valve seat 18. Because of restricted fluid flow through the fluid flow regulator 15 downstream of the valve member 16, for instance caused by the resistance controller 29 some of the fluid (not shown) that has flowed past the valve member 16 and valve seat 18, pushes back against the valve member 16, against the overall direction of fluid flow, shown by the arrow 30, because of the shape of the seat. The greater the fluid force and pressure on the upstream side of the valve member 16, the greater the fluid support from the downstream side of the valve member. If the fluid force and pressure on the upstream side of the valve member 16 is reduced, the fluid support from the downstream side of the valve member is also reduced.

The arrow 30 shows the overall direction of the flow of fluid and the longitudinal axis of the valve chamber 17.

The valve member 16 has a tab 28 that is used to locate the valve member inside the chamber 17.

The valve member 16 also has an aperture 32 in it for positioning the valve member inside the valve chamber 17. The valve chamber 17 has a post 34, the aperture 32 in the valve member 16 is located over the post 34. That is the post 34 is passable through the aperture 32 when the valve member 16 is inside the valve chamber 17.

Although the invention has been described hereabove with reference to a number of specific examples and embodiments, the invention is not limited thereto. Instead, the invention also covers the subject matter defined by the claims, which now follow.

The invention claimed is:

1. A check valve comprising:
   a housing with at least one inlet and at least one outlet, the housing defining an inflow chamber connected to the at least one inlet and an outflow chamber connected to the at least one outlet, wherein in the closed position, multiple inlets debouche in the inflow chamber;
   a valve seat which defines a passage between the inflow chamber and the outflow chamber;
   a shutter which is displaceable with respect to the valve seat between a closed position, in which the shutter closes the passage so that substantially no fluid can flow through the passage, and an open position in which the shutter is removed from the valve seat and leaves the passage at least partly free so fluid can flow from the at least one inlet to the at least one outlet via the passage; and
   a bias element which pretensions the shutter towards its closed position,
   wherein the check valve further comprises a guide pin for guiding the shutter between the open and closed positions, wherein the guide pin at least partly extends in the inflow chamber in a direction away from the shutter, the guide pin being movably guided in a guide sleeve,
   wherein the bias element is arranged on a side of the shutter facing the at least one outlet, and
   wherein the guide pin and the guide sleeve extend only in the direction away from the shutter towards the inlet.

2. The check valve according to claim 1, wherein the guide pin extends beyond the valve seat in the first direction as seen from the shutter.

3. The check valve according to claim 1, wherein the shutter comprises a plate shaped body.

4. The check valve according to claim 1, comprising multiple inlets arranged radially symmetrically around a longitudinal axis coinciding with the guide pin.

5. The check valve according to claim 1, comprising multiple outlets arranged radially symmetrically around a longitudinal axis coinciding with the guide pin.

6. The check valve according to claim 1, wherein the bias element is disposed in the outflow chamber.

7. The check valve according to claim 1, wherein the bias element directly contacts the shutter.

8. The check valve according to claim 1, wherein the bias element comprises a compression spring.

9. The check valve according to claim 8, wherein the compression spring is disposed and guided around the at least one stop.

10. The check valve according to claim 9, wherein the stop comprises two stop elements, one of which is fixed to the shutter and another of which is fixed to the housing, wherein the compression spring is guided around the stop elements and disposed between them.

11. The check valve according to claim 1, comprising at least one stop for limiting movement of the shutter beyond the open position.

12. The check valve according to claim 1, comprising an O-ring arranged between the shutter and the valve seat.

13. The check valve according to claim 1, wherein the guide pin is a monolithic part with the shutter.

14. A fluid flow regulator, comprising:
   a valve chamber having a fluid inlet and a fluid outlet; and
   a valve member inside the valve chamber, the valve member moveable inside the valve chamber,
   wherein the fluid flow regulator further comprises the check valve according to claim 1.

15. A check valve comprising:
   a housing with at least one inlet and at least one outlet, the housing defining an inflow chamber connected to the at least one inlet and an outflow chamber connected to the at least one outlet, wherein in the closed position, multiple inlets debouche in the inflow chamber;
   a valve seat which defines a passage between the inflow chamber and the outflow chamber;
   a shutter which is displaceable with respect to the valve seat between a closed position, in which the shutter closes the passage so that substantially no fluid can flow through the passage, and an open position in which the shutter is removed from the valve seat and leaves the passage at least partly free so fluid can flow from the at least one inlet to the at least one outlet via the passage;
   a bias element which pretensions the shutter towards its closed position; and
   at least one stop for limiting movement of the shutter beyond the open position,
   wherein the check valve further comprises a guide pin for guiding the shutter between the open and closed positions, wherein the guide pin is movably guided in a guide sleeve, and wherein the guide pin and the guide sleeve both at least partly extend in the inflow chamber only in a direction away from the shutter, the guide pin being movably guided in a guide sleeve,
   wherein the bias element comprises a compression spring,
   wherein the compression spring is disposed and guided around the at least one stop, and
   wherein the stop comprises two stop elements, one of which is fixed to the shutter and another of which is fixed to the housing, wherein the compression spring is guided around the stop elements and disposed between them.

* * * * *